May 20, 1952  E. C. HARTWIG  2,597,082

REVERSE PLATING TIMER

Filed Nov. 2, 1948

WITNESSES:
Robert C Baird
Ross Rogers Jr.

INVENTOR
Edward C. Hartwig.
BY
Hyman Diamond
ATTORNEY

Patented May 20, 1952

2,597,082

UNITED STATES PATENT OFFICE 2,597,082

REVERSE PLATING TIMER

Edward C. Hartwig, Tonawanda, N. Y., assignor to Westinghouse Electric Corporation, East Pittsburgh, Pa., a corporation of Pennsylvania Application November 2, 1948, Serial No. 57,997

5 Claims. (Cl. 250—27)

1

My invention relates to electronic timers and particularly to timers useful in reverse electroplating operations.

A novel electroplating method has been developed in which plating current of one polarity is applied for a period of 2 to 40 seconds to deposit a microscopic increment of metal and then the current is reversed for a period of from ½ to 5 seconds, respectively, to remove a portion of the previously plated increment. This method and the resultant advantages are explained more fully in the copending application, Serial No. 610,107, filed August 10, 1945, now Patent No. 2,451,341, dated October 12, 1948, and assigned to Westinghouse Electric Corporation. An automatic timer is required to provide accurate timing intervals for this purpose.

In some operations reverse plating processes have been carried out with the use of synchronous motor timers. Such timers have several disadvantages some of which harm the effectiveness of the electroplating process and others of which render the process slower and more expensive. Tests made with one synchronous motor timer indicate that timing errors are often of the magnitude of .02 to .04 second and remain substantially constant when the length of the timing interval is changed. If the error remains within the same range when ½ second is the time interval such a synchronous motor will provide timing often having an error of 4% to 8%. Such an error is likely to change greatly the characteristics of a plating job.

Further disadvantages are found in the difficulty incurred in changing the timing interval measured by synchronous motor timers. It is the custom in suing synchronous motor timers of which I am aware to change the timing interval by changing the cam mechanism which actuates the switches. If a manufacturing process is such that several different time intervals must be measured by the same at different times by the same timer, the labor involved in changing the cams used on the timers will become burdensome.

It is accordingly an object of my invention to provide a reverse plating system in the operation of which the duration of the currents of opposite polarity shall be accurately timed.

It is also an object of my invention to provide a novel electronic timer for use with reverse electroplating apparatus.

It is a further object of my invention to provide an electronic timer which will pass current of one polarity through a load for a predetermined time interval and pass current of the other polarity for an independently controlled interval.

In accordance with my invention, a pair of electric valves having at least three electrodes are connected across a source. A timing capaci-

2 tor connected to the control electrode and cathode of the first valve is charged to a potential sufficient to block the conductivity of that valve. When the second valve becomes conductive, it actuates a relay which controls the flow of electroplating current and shunts charging current by the timing capacitor. After a predetermined time interval, the capacitor is discharged through a resistor sufficiently to decrease the biasing voltage of the first valve and allow it to become conductive. Current flowing through the first valve charges a second timing capacitor, which is connected to the control electrode and cathode of the second valve, to such a potential that it causes the second valve to become non-conductive. When the second valve becomes non-conductive, it reverses the electroplating current and interrupts the anode-cathode circuit of the first valve causing the first valve to become non-conductive. The timing capacitor connected to the control electrode of the second valve then discharges through a bleeder resistor sufficiently to allow the second valve again to become conductive, and the cycle of operation is repeated.

The features of my invention which I consider to be novel are set forth with more particularity in the appended claims. The invention itself, however, together with additional objects and advantages thereof, may be better understood from the following description of a specific embodiment thereof when read in connection with the accompanying drawing in which:

Figure 1:
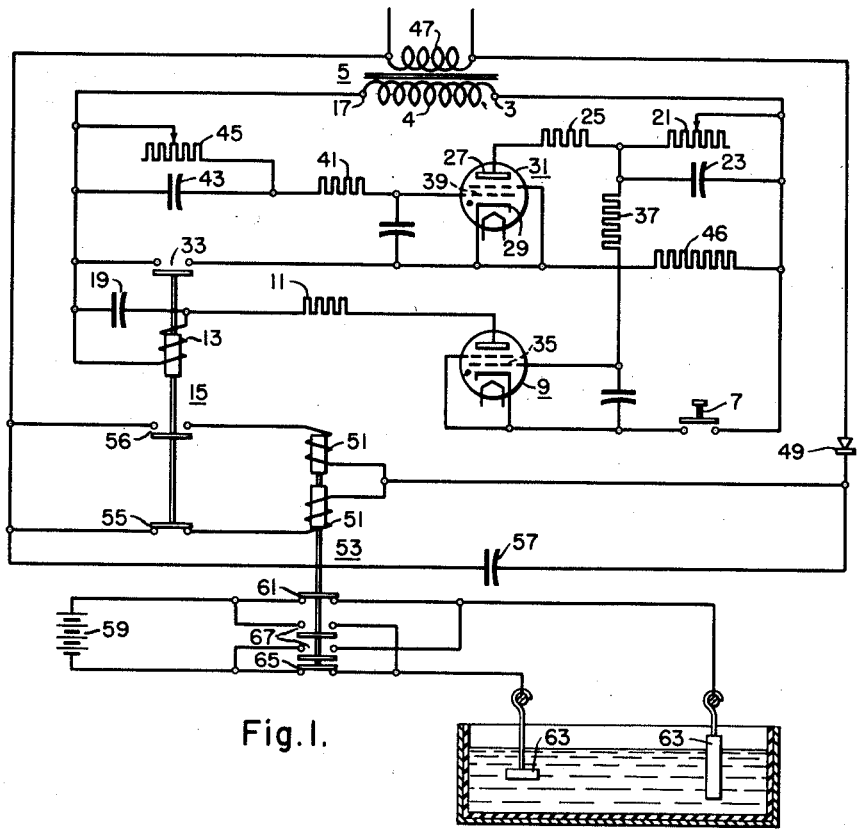
Figure 1 is a circuit diagram of a control system embodying my invention.

As shown in Fig. 1, one terminal 3 of the secondary 4 of a power transformer 5 is connected through a start switch 7, an electric valve 9, a resistor 11, the operating coil 13 of a relay 15 to the other terminal 17 of the transformer secondary 4. An anti-chattering condenser 19 is connected across the operating coil 13 of the first relay 15, A second circuit may be traced from one terminal 3 of the transformer secondary 4 through a variable resistor 21 and first timing capacitor 23 in parallel, a second resistor 25, the anode 27 and cathode 29 of the second electric valve 31, and the normally open contacts 33 of the relay 15 to the other terminal 17 of the secondary winding 4. The control grid 35 of the first valve 9 is connected through a grid resistor 37 to the first timing capacitor 23. The control grid 39 of the second valve 31 is connected through a grid resistor 41 and a second timing capacitor 43 and second variable resistor 45 connected in parallel, to the lower terminal 17 of the transformer secondary 4. A charging resistor 46 is connected between the upper terminal 3 of the transformer secondary 4 and the cathode 29 of the second valve 31. A circuit can be traced from one terminal of the primary winding 47 of the transformer 5 through a rectifier 49, the actuating coils 51 of a second relay 53 and the relay contacts 55 to the other terminal of the primary 47 of the transformer 5. A condenser 57 is connected across the operating coils of the second relay to smooth the rippling current through the relay 53.

The electroplating circuit may be traced from the positive terminal of a source of direct current illustrated as a battery 59 through the normally closed contacts 61, the plating electrodes 63 and the normally closed contacts 65 to the negative terminal of the source.

Operation of the circuit is initiated by closure of the starting switch 7 which impresses the line potential across the first valve 9. The control electrode 35 of the first valve 9 is at a firing potential, since the first timing capacitor 23 is now maintained in an uncharged condition by its bleeder resistor 21. The first valve 9 now becomes conductive actuating the first relay 15 and thereby closing the normally open contacts 33 in the cathode circuit of the second valve 31.

Prior to closure of these contacts 33, the second timing capacitor 43 has been charged through the charging resistor 46, the cathode 29 and the control grid 39 of the second valve 31 and the grid resistor 41. The terminal of the second timing capacitor 43 connected to the grid 39 is negative with respect to the terminal connected to the cathode 29. When the relay contacts 33 are closed, the control grid 39 of the second valve 31 is negative with respect to the cathode 29 and this valve 31 cannot become conductive. The charging resistor 46 is now connected directly across the transformer secondary 4 and no longer passes charging current to the second timing condenser 43. The second timing condenser 43 now discharges through its variable bleeder resistor 45, and the grid 39 of the second valve 31 becomes less negative until the second valve 31 becomes conductive. When this valve 31 becomes conductive, it passes current through the resistor 25 to the first timing capacitor 23 charging it so that its left-hand terminal becomes negative with respect to its right-hand terminal. Valve 9 is then rendered non-conductive.

The first valve remains non-conductive, deactivating the first relay 15 and opening the cathode circuit of the second valve 31. The second valve 31 becomes non-conductive allowing the first control capacitor 23 to discharge through its bleeder resistor 21, until the grid 35 of the first valve 9 is at a potential above the critical firing potential and the first valve 9 becomes conductive. The cycle is then repeated.

At the beginning of operation the normally closed contacts 55 of the first relay closes a circuit through the lower operating coil 51 of the second relay 53. This holds closed the normally closed contacts 61 and 65 of the electro-plating circuit and the upper plating electrode is positive. When the first valve 9 is conductive, it actuates the coil 13 of the first relay 15 closing the normally open contacts 56 and opening the normally closed contacts 61 and 65 of the electroplating second relay 53 is actuated and the lower coil 51 is released. The second relay then opens the normally closed contacts 65 and 61 and closes the normally open contacts 67 in the electroplating circuit, and the lower plating electrode becomes positive.

In this circuit the first relay 15 controls the operation of the second relay 53, which in turn determines the polarity of the plating electrodes 63. If it is desired, the first valve 9 can have a current rating which will allow it to actuate a larger relay than the one I have described. If such a valve is chosen, the first relay 15 can be connected so as to reverse the electroplating current directly and the second relay 53 can be eliminated.

Figure 2:
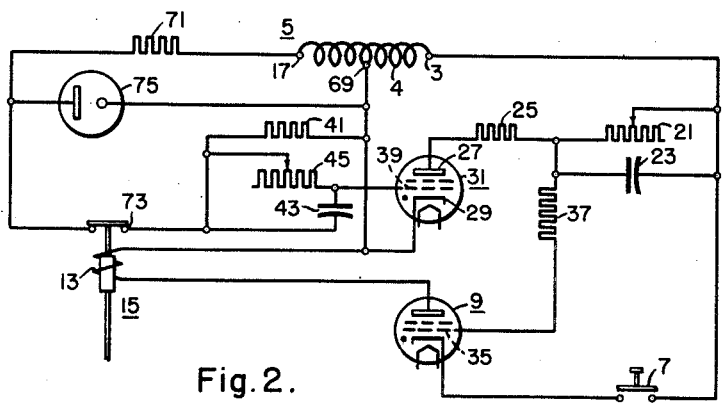
Fig. 2 shows a modification of a control system according to my invention.

Fig. 2 shows a modification of certain portions of Fig. 1. The changes relate to control of the grid of the second tube 31. The relay 15 is connected between the grid timing circuit and one terminal 17 of the secondary 4 of the supply transformer 5. A mid-tap 69 on the supply transformer 5 is connected to the cathode 29 of the second tube 31. A resistor 71 is connected between one terminal 17 of the supply transformer 5 and the contact 73 of the relay 15. A voltage regulator tube 75 is connected between the mid-tap 69 of the supply transformer 5 and the contact 73 of the relay 15. A capacitor 43 is connected between the grid 39 of the second tube 31 and contact 73 of the relay 15. A variable resistor 45 is connected across the capacitor 43. The cathode 29 of the second tube 31 is connected through the actuating coil 13 of the relay 15 to the anode of the first tube 9. The cathode of the first tube 9 is connected through the start switch 7 through one terminal 3 of the supply transformer 5.

As was the case with the modification shown in Fig. 1, operation of the circuit is initiated by closure of the starting switch 7 which connects the first valve 9 across a portion of the secondary 4 of the supply transformer 5. The first valve 9 becomes immediately conductive actuating the relay 15 to open the contacts 73.

Prior to closure of the starting switch 7, the capacitor 43 has been charged by a grid current flowing from one terminal 17 of the supply transformer secondary 4 through the resistor 71, the close contact 73, the capacitor 43, grid 39, and the cathode 29 of the second tube 31 to the center tap 69 of the supply transformer 5. The peaks of the voltage wave supplied by the transformer 5 are made uniform by the action of voltage regulated tube 75. The capacitor 43 is thus charged to a plurality which will cause it to bias the grid 39 of the second valve to such a potential as to cause the second valve 31 to remain unconductive.

When the contacts 73 are opened as a result of current flow through the first valve 9 and the actuation coil 13, the charging circuit of the capacitor 43 is opened and the capacitor 43 begins to discharge through the resistance 45. After a pre-set time interval the second valve 31 becomes conductive and begins to charge the capacitor 23. After the capacitor 23 has been charged sufficiently, the voltage of the grid 35 of the first valve 9 is lowered so that the first valve 9 becomes non-conductive. The contacts 73 reclose and the capacitor 43 again begins to charge in such a way as to bias the grid 39 of the second valve 31 to non-conductivity. The second valve 31 becomes non-conductive and the timing capacitor 23 discharges through its leader resistor 21 raising the potential of the grid 35 of the first valve 9 until the first valve again becomes conductive. This sequence of operations continues thus providing timed opening and reclosing intervals for the relay 15. The relay 15 is connected to the electroplating circuit in the manner shown in Fig. 1.

Other elements of this circuit are the same as those shown in Fig. 1.

While I have shown and described a specific embodiment of my invention, I am aware that many other modifications thereof may be made without departing from the spirit of the invention. I do not intend therefore to limit my invention to the specific embodiment disclosed.

I claim as my invention:

1. In combination, a first electron discharge device having an anode, a cathode, and a control electrode and adapted to be connected to a source of current, an energy storage device adapted to be connected between said control electrode and one terminal of said source, a direct current path from the other terminal of said source to said energy storage device, a second energy storage device connected between one terminal of said source and one electrode of said first electron discharge device, a second electron discharge device having an anode, a cathode, and a control electrode and adapted to be connected in circuit with said source, connections between said second energy storage device and the control electrode of said second electron discharge device, a relay in circuit with said second electron discharge device and having contactors, connections between said contactors and said first energy storage device such that said contactors control the charging of said first energy storage device, and connections between said contactors and said first electron discharge device such that said contactors control the continuity of the anode-cathode circuit of said first electron discharge device.

2. In combination, a first electron discharge device having an anode, a cathode, and a control electrode and adapted to be connected to a source of current, a capacitor adapted to be connected between said control electrode and one terminal of said source, a direct current path from the other terminal of said source to said capacitor, a second capacitor connected between one terminal of said source and one electrode of said first electron discharge device, a second electron discharge device having an anode, a cathode, and a control electrode and adapted to be connected in circuit with said source, connections between said second capacitor and the control electrode of said second electron discharge device, a relay in circuit with said second electron discharge device and having contactors, connections between said contactors and said first energy storage device such that said contactors control the charging of said first energy storage device, and connections between said contactors and said first electron discharge device such that said contactors control the continuity of the anode-cathode circuit of said first electron discharge device.

3. In combination, a first electron discharge device having an anode, a cathode, and a control electrode and adapted to be connected to a source of current, an energy storage device adapted to be connected between said control electrode and one terminal of said source, connections including a high impedance between the anode and the cathode of said first electron discharge device, a second energy storage device adapted to be connected between one terminal of said source and one electrode of said first electron discharge device, a second electron discharge device, having an anode, a cathode, and a control electrode and adapted to be connected in circuit with said source, connections between said second energy storage device and the control electrode of said second electron discharge device, a relay in circuit with said second electron discharge device and having contactors, connections between said contactors and said first energy storage device such that said contactors control the charging of said first energy storage device, and connections between said contactors and said first electron discharge device such that said contactors control the continuity of the anode-cathode circuit of said first electron discharge device.

4. In combination, a first electron discharge device having an anode, a cathode, and a control electrode and adapted to be connected to a source of current, an energy storage device adapted to be connected between said control electrode and one terminal of said source, a direct current path having a high impedance adapted to be connected between the other terminal of said source and said energy storage device, a second energy storage device adapted to be connected between one terminal of said source and one electrode of said first electron discharge device, a second electron discharge device having an anode, a cathode, and a control electrode and adapted to be connected in circuit with said source, connections between said second energy storage device and the control electrode of said second electron discharge device, a relay in circuit with said second electron discharge device and having contactors, connections between said contactors and said first energy storage device such that said contactors control the charging of said first energy storage device, and connections between said contactors and said first electron discharge device such that said contactors control the continuity of the anode-cathode circuit of said first electron discharge device.

5. A timer for controlling current flow in a first circuit, a second circuit comprising a first electric valve having an anode, a cathode, and a control electrode and connected across a source of alternating current, a capacitor connected in a resistive circuit between said control electrode and the cathode, a second electric valve having an anode, a cathode, and a control electrode and being connected between one terminal of said source and a terminal of said capacitor, a capacitor connected in a resistive circuit between the cathode of said second electric valve and the control electrode of said second valve, a high impedance path connected between one terminal of said source and the cathode of said second electric valve, and a relay having contactors, connections between said contactors and said first energy storage device such that said contactors control the charging of said first energy storage device, and connections between said contactors and said first electron discharge device such that said contactors control the continuity of the anode-cathode circuit of said first electron discharge device.

EDWARD C. HARTWIG.

REFERENCES CITED

The following references are of record in the file of this patent:

UNITED STATES PATENTS

| Number | Name | Date |
| --- | --- | --- |
| 1,534,709 | Holt | Apr. 21, 1925 |
| 2,053,143 | Frederick | Sept. 1, 1936 |
| 2,306,237 | Wolfner | Dec. 22, 1942 |
| 2,313,943 | Jones | Mar. 16, 1943 |
| 2,421,835 | Durant | June 10, 1947 |
| 2,442,238 | Haung | May 25, 1948 |
| 2,451,341 | Jernstedt | Oct. 12, 1948 |
| 2,463,318 | Schneider et al. | Mar. 1, 1949 |